United States Patent
Tagge et al.

(10) Patent No.: US 7,101,426 B2
(45) Date of Patent: Sep. 5, 2006

(54) INORGANIC MATRIX COMPOSITE REINFORCED BY IONICALLY CROSSLINKED POLYMER

(75) Inventors: Christopher D. Tagge, San Carlos, CA (US); Jacob Freas Pollock, Berkeley, CA (US); Ken Saito, Berkeley, CA (US)

(73) Assignee: Innovative Construction and Building Materials, LLC, Emeryville, CA (US)

( * ) Notice: Subject to any disclaimer, the term of this patent is extended or adjusted under 35 U.S.C. 154(b) by 0 days.

(21) Appl. No.: 10/952,123

(22) Filed: Sep. 27, 2004

(65) Prior Publication Data

US 2006/0037515 A1 Feb. 23, 2006

Related U.S. Application Data

(60) Provisional application No. 60/603,491, filed on Aug. 20, 2004.

(51) Int. Cl.
| | | |
|---|---|---|
| *C08L 3/04* | (2006.01) | |
| *C08L 3/08* | (2006.01) | |
| *C08L 1/08* | (2006.01) | |
| *C08L 1/30* | (2006.01) | |
| *C04B 24/10* | (2006.01) | |
| *C04B 111/30* | (2006.01) | |

(52) U.S. Cl. ............... 106/217.01; 106/162.8; 106/162.81; 106/162.82; 106/172.1; 106/197.01; 106/204.01; 106/204.3; 106/217.3; 106/727; 106/730; 106/779; 106/780; 106/804; 106/805; 536/43; 536/84; 524/35; 524/45; 524/47

(58) Field of Classification Search ........... 106/162.81, 106/172.1, 197.01, 217.01, 217.3, 217.9, 106/287.35, 727, 730, 779, 780, 804, 805, 106/162.8, 162.83, 204.01, 204.3; 536/43, 536/84; 524/35, 45, 47

See application file for complete search history.

(56) References Cited

U.S. PATENT DOCUMENTS

| | | | |
|---|---|---|---|
| 2,388,543 A | | 11/1945 | Hoggatt |
| 3,414,467 A | | 12/1968 | Ferrara |
| 3,462,283 A | | 8/1969 | Hjermstad et al. |
| 3,672,922 A | | 6/1972 | Brouilliard et al. |
| 4,021,257 A | * | 5/1977 | Bernett ........................ 524/6 |
| 4,505,775 A | * | 3/1985 | Harding et al. ................ 162/9 |
| 4,654,085 A | * | 3/1987 | Schinski ........................ 524/5 |
| 4,845,152 A | * | 7/1989 | Palmer ....................... 524/734 |
| 5,104,731 A | * | 4/1992 | Gager ........................ 428/323 |
| 6,113,923 A | * | 9/2000 | Le Bourhis ................. 424/401 |
| 6,447,615 B1 | * | 9/2002 | Hanchett et al. .............. 127/32 |
| 6,547,874 B1 | | 4/2003 | Eck et al. |
| 6,783,587 B1 | | 8/2004 | Sethuraman et al. |
| 6,846,856 B1 | * | 1/2005 | Soane et al. .................... 524/2 |
| 6,902,797 B1 | * | 6/2005 | Pollock et al. ........... 428/304.4 |
| 2002/0040666 A1 | | 4/2002 | Eck et al. |
| 2002/0128352 A1 | * | 9/2002 | Soane et al. ................ 523/200 |

FOREIGN PATENT DOCUMENTS

DE 10220659 11/2003

OTHER PUBLICATIONS

"UCARE Polymer LR 30M" Amerchol Functional Products Overview, (no date available).*
Product Data Sheet for AMYLOTEX Starch Derivatives, Hercules Inc., (May 2003).*
Aqualon Products for gypsum plaste, brochure, Hercules Inc., pp. 3-8, No Date Available.*
Bubond 382 Cationic high solids dry strenght, 2004 Buckman Laboratories, Inc. Product Data A699w May 2004, Material Safety Data Sheet.
MP 830 Series, A Mosiac System Program, Buckman Laboratories, Brochure, unknown author.

* cited by examiner

*Primary Examiner*—David M. Brunsman
(74) *Attorney, Agent, or Firm*—Christopher Paradies; Fowler White Bogggs Banker, P.A.

(57) ABSTRACT

An in situ ionic interaction between two additives, one a cationic strength enhancing additive and one an anionic crosslinking additive, is used to improve the mechanical properties of an article formed from a composite material. The composite has a discrete phase bound together with a film of the additives, such as gypsum crystals bound together by a film of substituted starch or cellulose ether.

17 Claims, 4 Drawing Sheets

INORGANIC MATRIX COMPOSITE REINFORCED BY IONICALLY CROSSLINKED POLYMER

CROSS-REFERENCE TO RELATED APPLICATION

The present application claims the benefit of previously filed Provisional Patent Application, Ser. No. 60/603,491, filed Aug. 20, 2004, and incorporates by reference the contents therein.

FIELD OF THE INVENTION

The field of the invention is polymer chemistry, more specifically, polymer chemistry for additives to improve the properties of compositions of matter for use in forming composite articles of manufacture, coatings and materials.

BACKGROUND OF THE INVENTION

Several types of charged substituted starches are commercially available and are currently used in paper-making and water treatment applications. Cationic starches are traditionally used on the wet end of paper manufacturing to increase wet strength and bind anionic "trash" in the wood pulp. Anionic and amphoteric starches are also used in paper formulations and at the size press of paper-making to improve finish and dry strength Amphoteric starches contain both cationic and anionic substituents. Charged starches are also used as flocculants in water treatment plants to remove contaminants. The cationic groups on charged starches are commonly quaternary amines and the anionic substituents are usually carboxylate or phosphate groups.

Some charged cellulose derivatives are also known. Carboxymethyl cellulose, an anionic cellulose derivative, is the most commonly used cellulose ether. It is mainly used as a thickener, but it is also used as an emulsion stabilizer, and textile warp sizing.

SUMMARY

Ionic interactions between a strength enhancing additive and a crosslinking additive provide a stable binding agent that substantially increases the toughness and strength of composites, coatings and other materials. For example, ionic interactions limit the crosslinked strength enhancing additive to the surface of a wallboard core that is transformed during in situ crosslinking. By selectively modifying the polymer or crosslinker, a network of polymer and inorganic crystals is formed that synergistically increases the nail pull resistance and strength of a composition of matter formed by mixing an inorganic phase, the strength enhancing additive and the crosslinking additive with water. It is thought, without limiting in anyway, that hydrophobic and hydrophilic substituent groups may be selected to provide chemical affinity for gypsum crystals, for example.

The additives disperse substantially throughout the composite by dissolution and are retained within composite by the ionic interactions, which prevents excessive migration to the surfaces of the composite.

For example, cationic cellulose can be produced by substituting some of the hydroxyl groups along the polymer backbone with cationic substituents, such as those containing quaternary amines. The cationic cellulose can be used with an ionic crosslinking additive to form a crosslinked polymer network in the same way as cationic starches described herein.

For example, cationic starches can be used to impart strength improvement to gypsum composites. The amount of improvement is dependent on the molecular weight, and thus viscosity, as well as the degree of substitution of the starch. Un-thinned cationic starches are too viscous to diffuse out of the granule during heating and thus remain as discrete particles in the inorganic matrix. Acid-thinning decreases viscosity, allowing the starch to disperse throughout the gypsum core and increasing the nail pull resistance of the composite. The cationic nature of the starch results in greater improvement than with an acid-modified starch of similar viscosity. This can be attributed to greater interaction with the polar surface of the gypsum crystals. Although acid-thinning increases starch dissolution, much of the starch migrates completely to the faces, reducing the amount of reinforcement in the core. Strength enhancement is improved by including an anionic polymer that interacts with the acid-thinned cationic starch to form a network of ionic cross-links that binds the starch in the core.

The combination of a cationic starch with an anionic cross-linker provides a unique method of obtaining strength-enhancing starch distribution and retention in the gypsum core while maintaining low slurry viscosity. The starch granules remain un-dissolved during mixing because of their cold water insolubility. The temperature of the stucco slurry in wallboard plants varies, but is often warmer than 100 F. The starch must therefore have limited or no solubility at this temperature. This is accomplished with a cationic starch by limiting the degree of substitution (DS). For example, one embodiment has a degree of substitution selected in a range less than 3 wt %.

For example, the starch granules swell and burst, releasing starch into solution. Granule swelling is increased by electrostatic repulsion of the cationic groups of the starch and granule rupture is facilitated by the stress of the gypsum crystals on the swollen granules, such as during a forming process. The molecules in solution natturally diffuse to water devoid of starch, resulting in distribution of starch substantially throughout the composite. When the cationic starch encounters the anionic crosslinking additive, which could be an anionic starch, the two additives interact to give a synergistic increase in viscosity. The high viscosity of the ionically cross-linked polymer system prevents further migration of the starch, such as during evaporation of the water, and improves starch retention in the composite. The cationic starch solution precipitates during evaporation of the water, producing a reinforcing film over the gypsum crystals. If the DS of the cationic starch is too low, the starch is likely to retrograde. Retrogradation, or re-association of starch molecules, reduces film strength and negatively affects strength-enhancement. Therefore, the DS of cationic starches for composites should be at least 0.3 wt %. It is preferred that the cationic starch have a peak viscosity of between 100 and 10,000 cps for 20 wt % solids at 195 F and a DS of between 0.3 and 3 wt %. More preferably, it has a peak viscosity of between 1,000 and 3,000 cps for 20 wt % solids at 195 F and a DS from 1.5 to 2.5 wt %.

Viscosity measurements were used to analyze the interaction between cationic starches and anionic crosslinking additives, including anionic starches. A rapid viscoanalysis (RVA) technique was used to determine starch viscosity response to cooking and subsequent cooling. The procedure begins by adding a cool (25 C) chamber of starch to a rheometer with a hot water jacket (90 C). The temperature of the chamber rises quickly to 90 C and is held at 90 C for 8 minutes and then cooled to 50 C over the next 4 minutes and held at 50 C for an additional 10 minutes. The rheometer used was a Brookfield DVII+ Pro with spindle #SC4-21 and a TC-112P water bath. A general response of starches to this type of temperature profile is low initial viscosity for the insoluble starch dispersion, increase to peak viscosity at the gel temperature of the starch as granules swell, decrease to trough viscosity as granules burst and starch enters solution, and increase to final viscosity as the solution is cooled. Starch granules in a gypsum matrix follow a similar temperature profile as the composite is dried. Although there is no cooling stage during drying, the final viscosity indicates the behavior of the starch as intra-molecular interactions increase, as when concentration increases as the composite dries. Thus, both cooling and drying lead to similar increases in the synergestic viscosity of the additives. The viscosity profiles and values for cationic starches and anionic starches and polymers were measured individually and compared to various combinations to determine the level of ionic association.

A blend of two polymers in solution that have no interaction has a viscosity that follows a logarithmic rule of mixtures. This allows the calculation of the theoretical viscosity of a blend of starches if there was no association. The increase of the measured viscosity of a combination of cationic and anionic starch over the theoretical viscosity indicates the degree of interaction between the two. This technique can be used to determine the DS, viscosity, and ratio of starches for which there is maximum interaction. A commercially available cationic starch, Cato 2A from National Starch and Chemical Co, was acid-thinned for two hours. Wescote 3050, an anionic starch from Western Polymer Co, was also acid-thinned for two hours. The two were tested by RVA using various ratios and a total of 20 wt % solids. All combinations showed an increase in the peak, trough, and final viscosities over the expected values. The greatest increase was in the final viscosity, when the intermolecular interactions are the strongest. A peak in final viscosity was found at around 25 wt % of anionic starch to total weight of solids (both anionic and cationic starches) (1:3 ratio).

Cationic starches can be combined with anionic starches or anionic cellulose ethers to improve gypsum composite strength. Certain anionic synthetic polymers also show interaction with cationic starches and can be used to improve retention in the core. High molecular weight polymers with a high concentration of anionic groups associate most strongly with cationic starches because of more opportunities for interaction per polymer chain. For example, 1 million molecular weight (MW) poly(styrene sulfonate) increases the viscosity of cationic starches at low additive levels. However, lignin sulfonates, which are commonly used in gypsum wallboard as dispersants, give no synergistic viscosity rise with cationic starches even at higher concentrations. Advantages of using anionic starches include no increase in slurry viscosity and no migration prior to starch dissolution. Similar properties may be achieved using anionic cellulose ether, such as carboxymethyl cellulose, by using an anionic cellulose ether with a DS that is low enough to prevent dissolution in cold water. Cold water means water at a processing temperature less than the temperature of the composition when it is heated, such as during setting or drying, for example.

Cationic cellulose ether may be used in some cases in place of cationic starch as a strength enhancing additive. Cellulose ethers may impart higher tensile strength and toughness than cationic substituted starches. The cationic cellulose may be used in combination with an anionic cellulose, anionic starch, or synthetic anionic polymer to ionically cross-link it. The preferred cationic cellulose ether of the invention has a low enough DS to make it cold water insoluble but is soluble at higher temperatures. Cold water soluble charged cellulose ethers may also be used but may increase the viscosity of the slurry. A low molecular weight charged cellulose ether and a complementary cold water insoluble charged cellulose ether may be used to prevent migration without significantly increasing slurry viscosity. Herein complimentary refers to ionic-cationic or cationic-anionic complementary charges.

Any combination of complementary charged polysaccharides or a charged polysaccharide with a complementary charged synthetic polymer may be used to improve strength enhancement and retention in the core. Examples include but are not limited to: cationic cellulose ether with anionic cellulose ether; cationic starch with anionic starch; cationic starch with anionic cellulose ether; cationic cellulose ether with anionic starch; anionic cellulose ether with cationic synthetic polymer; cationic cellulose ether with anionic synthetic polymer; anionic starch with cationic synthetic polymer; and cationic starch with anionic synthetic polymer.

Also, a cationic synthetic polymer may be added with other anionic synthetic polymers to improve the strength enhancement and retention in the core, so long as the specific polymers are selected to be retained in the wallboard core.

Specifically, FIGS. 1–4 show the synergistic effect of adding an anionic substituted starch and a cationic, acid-modified starch on the measured viscosity of slurry including water and 20 wt % solids (combination of the two additives). It is believed, without limiting the invention, that the synergistic increase in viscosity is associated with a decrease in migration of the substituted starch, such that the substituted starch is dispersed substantially throughout the composite. Thus, the substituted starch substantially strengthens the composite.

DETAILED DESCRIPTION

The drawings and detailed description describe specific examples of the invention; however, detailed examples and descriptions herein do not limit the scope of the invention. It is preferred that the present invention be limited not by the detailed description and drawings, but only by the claims that are eventually issued.

Figure 1:
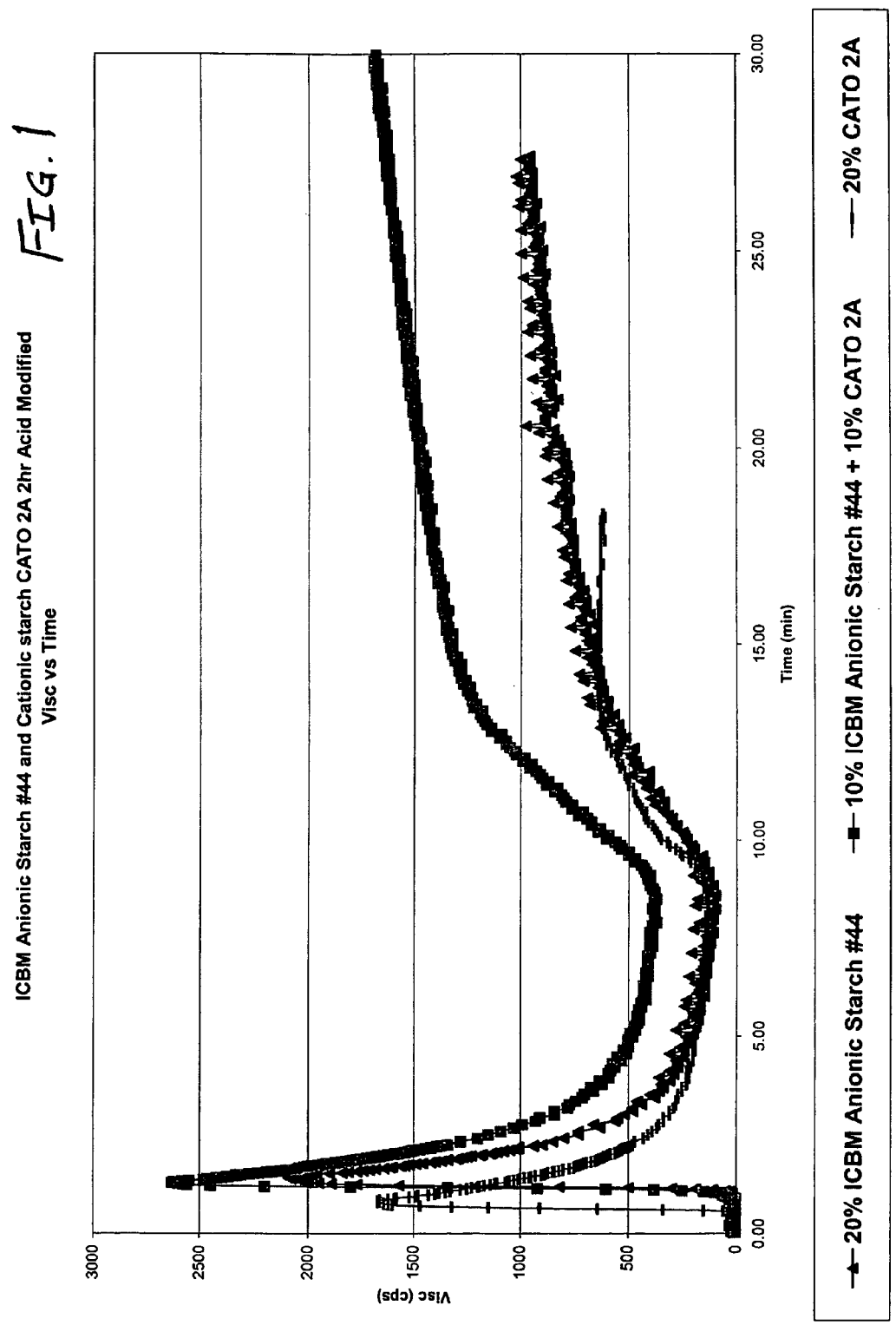
FIGS. 1–3 are RVA plots showing the synergistic interaction between cationic and anionic starches. In each chart, the mixture is compared to each starch alone. The total solids in each run is 20%.

FIG. 1 shows the synergestic effect of combining 10 wt % ICBM Anionic Starch #44 with a 10 wt % of CATO 2A, 2-hour, acid-modified starch. The synergistic effect increases both the tough viscosity and the final viscosity.

Figure 2:
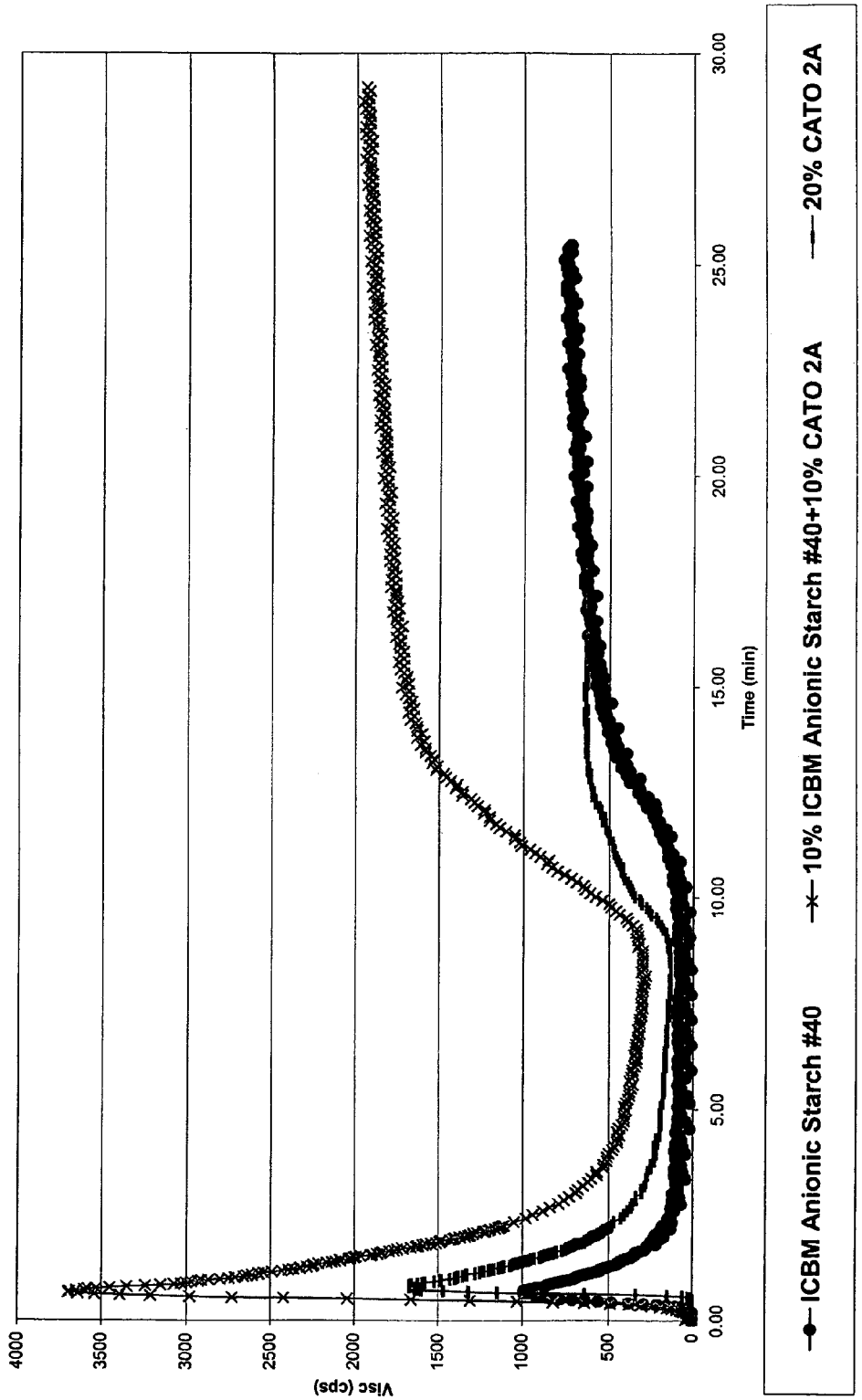

FIG. 2 shows a synergistic effect similar to that in FIG. 1 for 10 wt % ICBM Anionic Starch #40 and 10 wt % CATO 2A.

Figure 3:
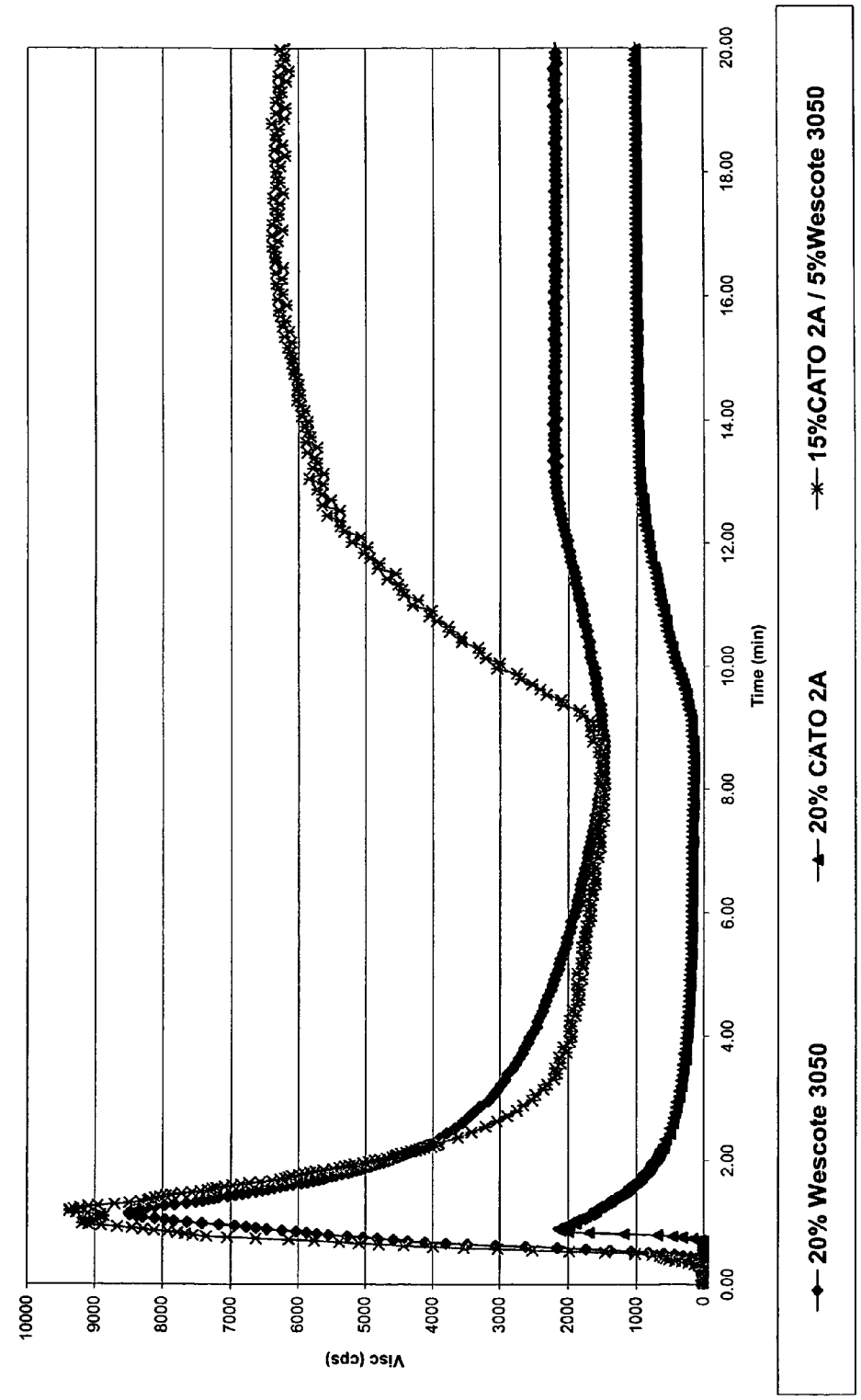

FIG. 3 shows the synergistic effect of combining 15 wt % CATO 2A with 5 wt % Wescote 3050. With only 5 wt % Westcote 3050, the trough viscosity is not substantially different from 20 wt % of the substituted Starch Westcote 3050; however, the final viscosity shows a dramatic synergistic effect.

Figure 4:
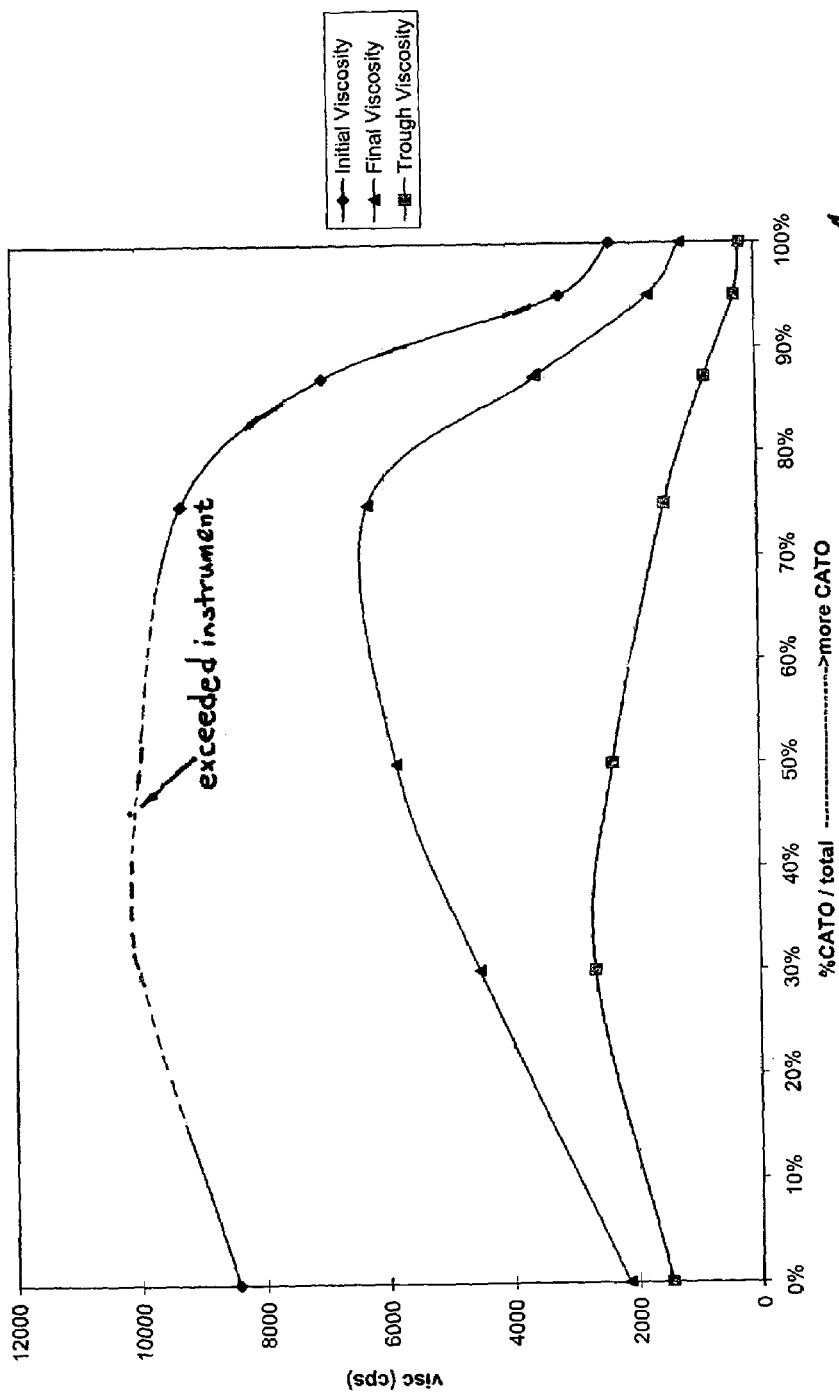
FIG. 4 shows synergy of CATO2A and Wescote 3050 for increasing CATO2A polymer percent addition.

FIG. 4 shows that the synergistic effect varies depending on the ratio of the crosslinking additive to the strengthening additive. It is preferred to use no greater than 75 wt % of crosslinking additive to total weight of additives.

In another preferred embodiment, the amount of crosslinking additive is no greater than 30 wt % of the total weight of both the strengthening additive and crosslinking additive.

In one embodiment, the degree of substitution of the strength enhancing additive is selected in a range from 0.5–3 wt %, which prevents dissolution of the strength enhancing additive during mixing in cold water, but provides sufficient charged substituent groups to ionically crosslink with the crosslinking agent. The range selected depends on several factors, including the ratio of crosslinking additive to strength enhancing additive.

SPECIFIC EXAMPLES

Preparation of Carboxymethyl Cellulose 1400 parts of a 90% by weight aqueous solution of ethanol/isopropyl alcohol (50:50) mixture was added to 100 parts ground cellulose. The suspension was cooled to 20° C. 4 parts of 50% by weight aqueous sodium hydroxide solution was added dropwise in a period of 30 minutes. After stirring for one hour, 3 parts monochloroacetic acid was added to the mixture which was then heated to 70° C. and held at that temperature for three hours. The mixture was then cooled to room temperature and neutralized by using a 37% by weight hydrochloric acid. The product was filtered and washed several times by using a 75% ethanol solution until the filtrate gave a negative response to silver nitrate solution. The solid was then dried in an overnight at 50° C.

Preparation of 2-hydroxypropyltrimethylammounium Chloride Cellulose 1400 parts of a 90% by weight aqueous solution of ethanol/isopropyl alcohol (50:50) mixture was added to 100 parts ground cellulose. The suspension was cooled to 20° C. 4 parts of 50% by weight aqueous sodium hydroxide solution was added dropwise in a period of 30 minutes. After stirring for one hour, 7 parts glycidyl trimethylammonium chloride was added to the mixture which was then heated to 70° C. and held at that temperature for three hours. The mixture was then cooled to room temperature and neutralized by using a 37% by weight hydrochloric acid. The product was filtered and washed several times by using a 75% ethanol solution. The solid was then dried in an overnight at 50° C.

Preparation of Carboxymethyl Starch

Acid-thinned dent corn starch (10% w/w) was dispersed in an aqueous solution of isopropyl alcohol (7% by weight). While the mixture was vigorously stirred at room temperature, 3 parts of sodium hydroxide and 5 parts of sodium monochloroacetate were added. The temperature of the mixture was then raised to 40° C. and stirred at that temperature for 3 hours. The resulting carboxymethyl starch was filtered and washed several times with 85% ethanol until the filtrate gave a negative response to silver nitrate solution. The obtained starch was then dried in an oven overnight at 40° C.

To determine the degree of substitution (DS), the carboxymethyl groups in the CMS were first converted to the acid form by acidifying with hydrochloric acid. The acidified starch was then filtered and washed with water until the filtrate gave negative response to silver nitrate solution. The starch was pregelled and titrated with a standardized solution of sodium hydroxide. Table 1 shows the results for the products obtained according to the example.

TABLE 1

| Samples | Substitution % | DS |
| --- | --- | --- |
| Reaction 1 | 0.55% | 0.011 |
| Reaction 2 | 0.36% | 0.007 |

Preparation of 2-hydroxypropyltrimethylammounium Chloride Starch 1400 parts of a 90% by weight aqueous solution of ethanol/isopropyl alcohol (50:50) mixture was added to 100 parts acid-thinned dent corn starch. The suspension was cooled to less than 20° C. 4 parts of 50% by weight aqueous sodium hydroxide solution was added dropwise in a period of 30 minutes. After stirring for one hour, 7 parts glycidyl trimethylammonium chloride was added to the mixture which was then heated to 70° C. and held at that temperature for three hours. The mixture was then cooled to room temperature and neutralized by using a 37% by weight hydrochloric acid. The product was filtered and washed several times by using a 75% ethanol solution. The solid was then dried in an overnight at 50° C.

Preparation of Hydroxypropyl Starch

A 2 L steel reactor was charged with 100 parts acid-thinned dent corn starch, 1.5 parts sodium hydroxide, 3 parts sodium chloride, and 500 parts of water. The reactor was sealed and then flushed several times with nitrogen. The mixture was vigorously stirred at room temperature for 20 minutes. The reactor was then charged with 3 parts propylene oxide, and the resulting mixture was then heated at 50° C. for 4 hours. Following the desired amount of time, the mixture was cooled to 30° C. and stirred at that temperature for 19 hours. The slurry was then neutralized with 37% by weight hydrochloric acid. The white solid was washed with water followed by an additional wash of an aqueous solution of methanol. The solid was then filtered and dried at 50° C. for 12 hours.

The hydroxypropyl substitution content was determined according to the method of ASTM D 3876-96 (2001). The hydroxypropyl starch was dried in an oven to remove residual moisture and then treated with an aqueous solution of hydroiodic acid, liberating ispropyl iodide. The isopropyl iodide was extracted in situ with an organic solvent and quantitated by gas chromatography using an internal standard technique. Table 2 shows the results for the products obtained according to the procedure outlined above.

TABLE 2

| Samples | Substitution % | DS |
| --- | --- | --- |
| Reaction 1 | 2.30% | 0.063 |
| Reaction 2 | 2.34% | 0.064 |
| Reaction 3 | 2.33% | 0.064 |
| Reaction 4 | 2.39% | 0.066 |
| Reaction 5 | 2.20% | 0.060 |

Preparation of Hydroxyethyl Starch

A 2 L steel reactor was charged with 100 parts starch, 1.5 parts sodium hydroxide, 3 parts sodium chloride, and 500 parts of water. The reactor was sealed and then flushed several times with nitrogen. The mixture was vigorously stirred at room temperature for 20 minutes. The head space was evacuated and the stirrer turned off. The head space was pressurized with 20 psi of ethylene oxide after which the stirrer was turned on, and the resulting mixture was then heated at 50° C. for 3.5 hours. Following the desired amount of time, the mixture was cooled to 30° C. and stirred at that temperature for 19 hours. The slurry was then neutralized with 37% by weight hydrochloric acid. The white solid was washed with water followed by an additional wash of an aqueous solution of methanol. The solid was then filtered and dried at 50° C. for 12 hours.

The hydroxypropyl substitution content was determined according to the method of ASTM D 4794-94 (1998). The hydroxyethyl starch was dried in an oven to remove residual moisture and then treated with an aqueous solution of hydroiodic acid, liberating iodoethane. The iodoethane was extracted in situ with an organic solvent and quantitated by gas chromatography using an internal standard technique. Table 3 shows the results for the products obtained according to the procedure outlined above.

TABLE 3

| Samples | Substitution % | DS |
|---|---|---|
| Reaction 1 | 2.60% | 0.096 |
| Reaction 2 | 2.97% | 0.110 |
| Reaction 3 | 2.73% | 0.100 |

TABLE 4

Summary of ICBM Substituted Starches

| ICBM # | Trade Name | Source | Type | Substitution Type | wt % | Conc. /rpm | Viscosity (cps) Peak | Trough | Final | Gel T |
|---|---|---|---|---|---|---|---|---|---|---|
| 1 | Wallboard Binder | AE Staley | acid-thinned dent corn | HE | 0.03% | | not tested | | | |
| 2* | Wallboard Binder | AE Staley | acid-thinned dent corn | HE | 11.43% | | not tested | | | |
| 3 | Wallboard Binder | AE Staley | acid-thinned dent corn | HE | 2.52% | 20% | 1500 | 150 | 1000 | 75 |
| 4 | Amylogel 03001 | Cargill | high amylose (70%) | HE | 5.23% | | no gelation even at high concentration | | | |
| 5 | Amylogel 03003 | Cargill | high amylose (50%) | HE | 2.60% | 10% | 1100 | 1050 | 1830 | 84 |
| 6 | Cargill Gel 03420 | Cargill | waxy maize | HE | 2.97% | 5% | 650 | 350 | 700 | 77 |
| 7 | Tapon | National Starch | acid-thinned waxy maize | HE | 3.04% | 40% | 65 | 40 | 100 | 74 |
| 8 | Cargill Gel 03420 | Cargill | waxy maize | HE | 2.73% | 5% | 270 | 200 | 300 | 79 |
| 9 | C165 | GPC | acid-thinned dent corn | HP | 1.10% | 20% | 850 | 75 | 750 | 74 |
| 10 | C165 | GPC | acid-thinned dent corn | HP | 1.22% | 20% | 325 | 25 | 300 | 77 |
| 11 | C165 | GPC | acid-thinned dent corn | acetyl | increasing | 20% | 1000 | 175 | 525 | 78 |
| 12 | C165 | GPC | acid-thinned dent corn | acetyl | V | 20% | 600 | 75 | 325 | 76–77 |
| 13 | C165 | GPC | acid-thinned dent corn | acetyl | V | 20% | 800 | 75 | 475 | 78 |
| 14 | C165 | GPC | high amylose (70%) | benzo | | 20% | 325 | 275 | 275 | 82 |
| 15 | C165 | GPC | high amylose (50%) | acetyl | | 10% | 125 | 100 | 100 | 88 |
| 16 | C165 | GPC | acid-thinned dent corn | butyryl | increasing | 20% | 525 | 125 | 250 | 79 |
| 17 | C165 | GPC | acid-thinned dent corn | butyryl | V | 20% | 575 | 100 | 225 | 80 |
| 18 | C165 | GPC | acid-thinned dent corn | butyryl | V | 20% | 375 | 150 | 375 | 76 |
| 19 | C165 | GPC | acid-thinned dent corn | HP | 2.30% | 20% | 530 | 30 | 600 | 78 |
| 20 | B20F | GPC | unmodified dent | HP | 3.61% | 8% | 1675 | 1075 | >2500 | 76 |
| 20A | ICBM SE 20 | ICBM | HP dent corn | acid-thinned | 1.72% | 8% | 150 | 15 | 75 | 77 |
| 21 | C165 | GPC | acid-thinned dent corn | HP | 3.09% | 20% | 450 | 30 | 600 | 77 |
| 22 | C165 | GPC | acid-thinned dent corn | HP | 0.31% | 20% | 375 | 60 | 2375 | 80 |
| 23* | C165 | GPC | acid-thinned dent corn | HP | 12.75% | 20% | 80 | 25 | 175 | 75? |
| 24 | C150 | GPC | acid-thinned dent corn | HP | 2.34% | 20% | 1500 | 100 | 1375 | 74 |
| 25 | C68F | GPC | acid-thinned dent corn | HP | 2.33% | 20% | 110 | 7.5 | 75 | 81 |

TABLE 4-continued

Summary of ICBM Substituted Starches

| ICBM # | Starting Material | | | Substitution | | Conc. | Viscosity (cps) | | | Gel T |
|---|---|---|---|---|---|---|---|---|---|---|
| | Trade Name | Source | Type | Type | wt % | /rpm | Peak | Trough | Final | |
| 26 | C140 | GPC | acid-thinned dent corn | HP | 2.07% | 20% | 1600 | 320 | 2250 | 77 |
| 27 | C165 | GPC | acid-thinned dent corn | HP | 0.44% | 20% | 325 | 40 | 2400 | 77 |
| 28 | C165 | GPC | acid-thinned dent corn | HP | 3.21% | 20% | 410 | 30 | 350 | 74 |
| 29 | C124 | GPC | acid-thinned dent corn | HP | 2.39% | 20% | 2280 | 570 | >2400 | 76 |
| 30 | C110 | GPC | acid-thinned dent corn | HP | 2.20% | 8% | 732 | 162 | 505 | 79 |
| 31 | C165 | GPC | acid-thinned dent corn | HP, Me | 0.24%, 0.92% | 20% | 215 | 35 | 112 | 78 |
| 32 | C165 | GPC | acid-thinned dent corn | Me | 1.03% | 20% | 82 | 38 | 105 | 79 |

*Cold Water Soluble

What is claimed is:

1. An organic-inorganic composite, comprising an inorganic phase and an organic phase, wherein the organic phase is formed of a strengthening additive of a cationic cellulose or a substituted starch ionically crosslinked by a crosslinking additive in situ, wherein the crosslinked strengthening additive forms a polymer network and the ionic interactions between the strengthening additive and the crosslinking additive substantially strengthen the organic-inorganic composite.

2. The composite of claim 1, wherein the strengthening additive is of the cationic cellulose having a cationic substituent of a quarternary amine.

3. The composite of claim 2, wherein the crosslinking additive is of an anionic polymer selected from one of the group consisting of an ionic substituted starch, an anionic cellulose ether, and an anionic synthetic polymer.

4. The composite of claim 3, wherein the crosslinking additive is of an anionic cellulose ether.

5. The composite of claim 4, wherein the anionic cellulose ether is a carboxymethyl cellulose.

6. The composite of claim 5, wherein the cationic cellulose has a degree of substitution of the cationic substituent selected in a range from 0.5 to 3 weight percent.

7. The composite of claim 1, wherein the strengthening additive is of a substituted starch having a degree of substitution selected in a range from 0.5 to 3 wt %.

8. The composite of claim 7, wherein the substituted starch is of a starch ether.

9. The composite of claim 8, wherein the starch ether has hydroxyethyl substituents.

10. The composite of claim 1, wherein the crosslinking additive is of an anionic substituted starch.

11. The composite of claim 1, wherein the cationic cellulose or the substituted starch has one or more hydroxyl groups substituted by a cationic substituent.

12. The composite of claim 11, wherein the cationic substituent is a quarternary amine.

13. The composite of claim 11, wherein the strengthening additive is of a cationic cellulose.

14. The composite of claim 13, wherein the crosslinking additive is of an anionic polymer selected from one of the group consisting of an anionic substituted starch, an anionic cellulose ether, and an anionic synthetic polymer.

15. A cationic cellulose comprising a cellulose having one or more of the hydroxyl groups substituted by a cationic substituent, wherein the cellulose is ionically crosslinked by a crosslinking additive of an anionic cellulose ether or an anionic substituted starch.

16. The cationic cellulose of claim 15, wherein the crosslinking additive is of the anionic cellulose ether.

17. The cationic cellulose of claim 16, wherein the anionic cellulose ether is a carboxymethyl cellulose.

* * * * *